(12) United States Patent
Ginzburg et al.

(10) Patent No.: US 9,135,008 B2
(45) Date of Patent: Sep. 15, 2015

(54) DEVICE AND METHOD FOR PERFORMING CONDITIONAL BITWISE SET/CLEAR/TOGGLE MANIPULATIONS IN A GENERAL PURPOSE REGISTER

(75) Inventors: Evgeni Ginzburg, Petah Tikva (IL); Keren Guy, Rishon Le-Zion (IL); Adi Katz, Ramat Gan (IL)

(73) Assignee: Freescale Semiconductor, Inc., Austin, TX (US)

( * ) Notice: Subject to any disclaimer, the term of this patent is extended or adjusted under 35 U.S.C. 154(b) by 871 days.

(21) Appl. No.: 13/392,925

(22) PCT Filed: Sep. 24, 2009

(86) PCT No.: PCT/IB2009/054185
§ 371 (c)(1),
(2), (4) Date: Feb. 28, 2012

(87) PCT Pub. No.: WO2011/036515
PCT Pub. Date: Mar. 31, 2011

(65) Prior Publication Data
US 2012/0155570 A1 Jun. 21, 2012

(51) Int. Cl.
*G06F 9/30* (2006.01)
(52) U.S. Cl.
CPC ........ *G06F 9/30145* (2013.01); *G06F 9/30018* (2013.01); *G06F 9/30032* (2013.01); *G06F 9/30072* (2013.01)
(58) Field of Classification Search
None
See application file for complete search history.

(56) References Cited

U.S. PATENT DOCUMENTS

| 5,704,052 | A | 12/1997 | Wu et al. |
| 6,507,899 | B1 * | 1/2003 | Oberlaender et al. ........ 711/169 |
| 7,346,761 | B2 * | 3/2008 | Chen et al. .................... 712/221 |
| 2002/0116602 | A1 | 8/2002 | Kissel et al. |
| 2006/0101246 | A1 | 5/2006 | Iwata |
| 2007/0106882 | A1 | 5/2007 | Thornton |

OTHER PUBLICATIONS

Hilewitz Y: "Advanced Bit Manipulation Instructions: Architecture, Implementation and Applications" Sep. 2008, pp. 22, 41, 59, and 60, and Abstract.
International Search Report and Written Opinion correlating to PCT/IB2009/054185 dated Jun. 14, 2010.

* cited by examiner

*Primary Examiner* — William B Partridge

(57) ABSTRACT

A device and a method for performing bitwise manipulation is provided. Multiple bitwise logic circuits are coupled to an instruction decoder, a register array and a rotator. Each bitwise logic circuit includes input multiplexers connected to an output multiplexer. The instruction decoder receives a bit manipulation instruction and sends to each corresponding input multiplexer a control signal based on a type of the instruction. Each input multiplexer of each bitwise logic circuit receives a control signal, a constant signal that has a value that is indifferent to the value of the mask, and a mask affected signal that has a value that is responsive to a value of an associated mask bit. Each input multiplexer selects between the constant signal and the mask affected signal based on the control signal, and outputs a selected signal. Each output multiplexer receives selected signals from each of the corresponding input multiplexers, and elects between the selected signal based on a value of an associated manipulated register bit and based on a value an associated control register bit.

20 Claims, 3 Drawing Sheets

DEVICE AND METHOD FOR PERFORMING CONDITIONAL BITWISE SET/CLEAR/TOGGLE MANIPULATIONS IN A GENERAL PURPOSE REGISTER

FIELD OF THE INVENTION

This disclosure relates generally to devices and to methods for performing bitwise manipulations.

BACKGROUND OF THE INVENTION

Communications protocols are changing rapidly. Modern communication devices are required to easily adjust to these changes. The adjustment may involve providing programmable control codes that may be tailored per communication protocol. Embedded RISC processors that are included within such communication devices may be programmed to execute these control codes.

A control code may include multiple conditional instruction groups. A typical conditional instruction group may alter a value of one or more bits based on a value of one or more control bits. For example, a "last" indication bit of a buffer descriptor can be set if a control bit of a status register indicates that an end of a frame was detected. A typical conditional instruction group may include two or three instructions. For example, a first instruction may check a value of a control bit and a second instruction (that may be referred to as a conditional branch instruction) may branch based on the value of the control bit.

Control codes usually include a large number of conditional instruction groups. The execution of these conditional instruction groups may reduce the throughput of a communication device that includes an embedded RISC processor.

SUMMARY OF THE PRESENT INVENTION

The present invention provides a method and a device as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects, and embodiments of the invention will be described, by way of example only, with reference to the drawings.

DETAILED DESCRIPTION OF THE DRAWINGS

In the following specification, the invention will be described with reference to specific examples of embodiments of the invention. It will, however, be evident that various modifications and changes may be made therein without departing from the broader spirit and scope of the invention as set forth in the appended claims.

Because the device implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Figures 1, 2:
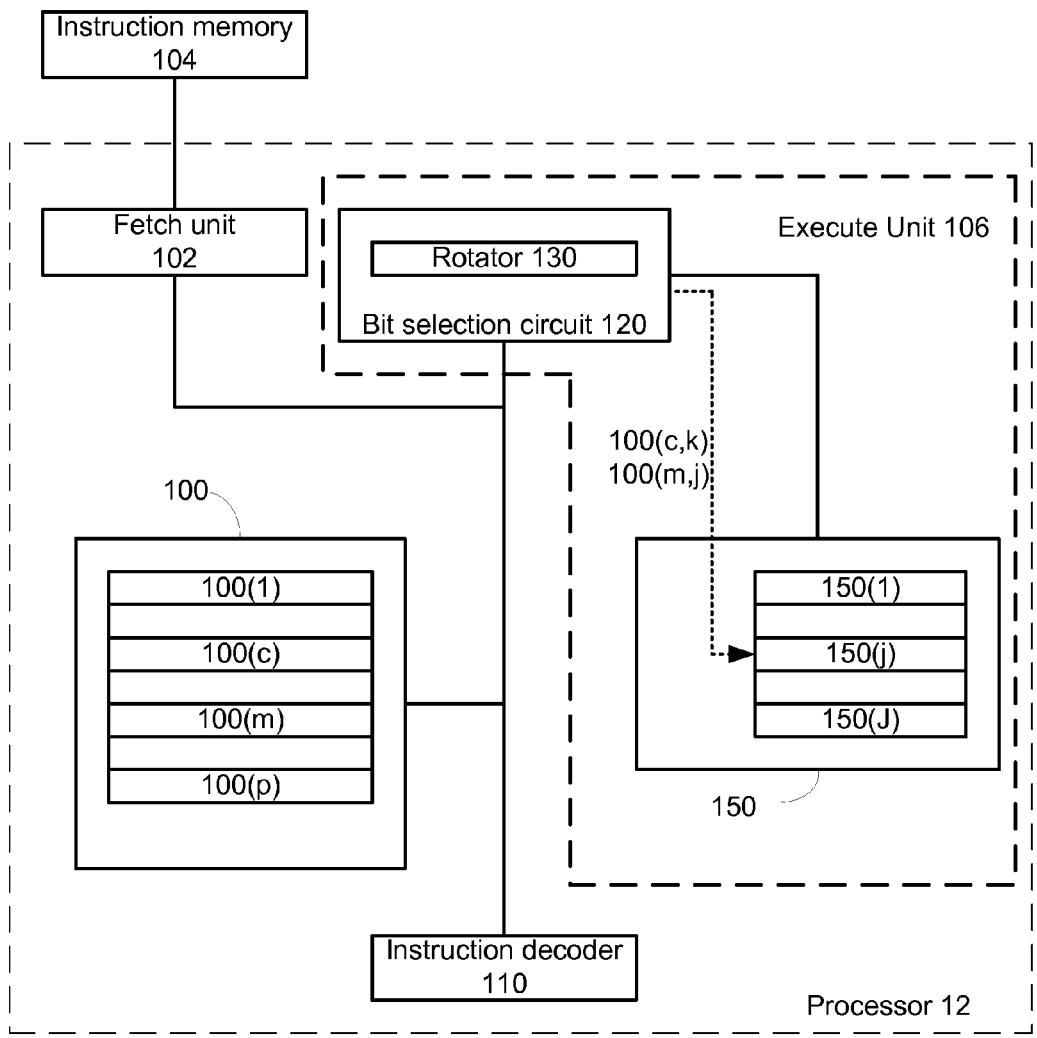
FIG. 1 schematically shows an example of an embodiment of a bit manipulation instruction.
FIG. 2 schematically shows an example of an embodiment a device.

FIG. 1 schematically shows an example of an embodiment of bit manipulation instruction 200.

Bit manipulation instruction 200 includes bit manipulation instruction type identifier 210, at least one mask identifier such as 220 and 222, shift factor identifier 230, control register identifier 240 and manipulated register identifier 250.

A bit manipulation instruction causes a processor to manipulate one or more bits of a manipulated register based upon values of one or more bits of a control register. Typically, each manipulated register bit is associated with a control register bit and a bitwise logic circuit of the processor. The control register content may be rotated by a shift factor (denoted 's') so that the j'th manipulated register bit may be associated with the k'th control register bit. Indexes j and k and integers and k=(j+s) Modulo J, wherein J is the length of the control register.

Control register identifier 240 identifies the control register. Manipulated register identifier 250 identifies the manipulated register. The control register and manipulated register can belong to the register array of the processor.

The result of the bit manipulation instruction is a selectively modified bit of the manipulated register. This bit is referred to as a selectively modified bit because the modification is a conditional modification—as it may depend on a value of a control register bit. As illustrated below, bitwise logic circuits output signals (referred to as output signals) that represent manipulated bits. These output signals may be written to the manipulated register. A manipulated register is a register that its content may be manipulated (changed) by a bit manipulation instruction.

The execution of a bit manipulation instruction may involve using a mask. A mask may prevent (or facilitate) a manipulation of one or more manipulated register bits. The mask can be defined by one or more mask identifier such as first and second mask identifiers 220 and 222.

The mask can be identified in various manners. Various non limiting examples of mask identification manners may include: (i) a mask can be selected out of predefined masks and the one or more mask identifiers can elect between these predefined masks, (ii) each bit of a mask identifier can indicate the value of a single bit of the mask, (ii) each bit of a mask identifier can indicate the value of a group of bits of the mask, and (iii) a mask can include a sequence of mask bits of the same value and other bits of another value and the one or more mask identifiers can provide an indication about the boundaries of that sequence.

For example, assuming that J=32 and that the mask includes a sequence of set ('1') bits then first mask identifier 220 can identify the first set bit of the mask while second mask identifier 222 can identify the second set bit of the mask. Thus, a mask that equals 00000000111111111111111111110000 will be identified by a first mask identifier 220 that points to the fifth bit (that is the first set bit of the mask) and by a second mask identifier 222 that points to the twenty fourth bit (that is the last set bit of the mask). Yet for another example, a mask that equals 11110000000000001111111111111111 will be identified by a first mask identifier 220 that points to the twenty eighth bit and by a second mask identifier 222 that points to the sixteenth bit.

The mask can be reset for all bits except one and a mask identifier can point to this bit—for example by indicating the number of set bit to the right of that bit and, additionally or alternatively, to the left of that bit.

Bit manipulation instruction type identifier 210 can be a part of an opcode field or be the opcode itself. It provides an indication about the type of the bit manipulation instruction. For example, it can indicate whether the bit manipulation is either one of the following instructions: (i) set associated manipulated register bit if associated control bit is set instruction, (ii) set associated manipulated register bit if associated control bit is reset instruction, (iii) reset associated manipulated register bit if associated control bit is set instruction, (iv) reset associated manipulated register bit if associated control bit is reset instruction, (v) toggle associated manipulated register bit if associated control bit is set instruction, and (vi) toggle associated manipulated register bit if associated control bit is reset instruction.

Shift factor identifier 230 indicates how to shift the content of the control register. It represents shift factor s. The direction of the shift (right or left) can be predefined or may be indicated by the shift factor identifier 230.

FIG. 2 schematically shows an example of an embodiment of device 10. Device 10 may be a communication device, a router, a switch, a base station, a mobile device, a cellular phone, a media player, a smart phone, a personal data assistant, a printed circuit board, a medical device, a battery powered device, a laptop computer, a micro computer, and the like. Device 10 can include at least one integrated circuit or be an integrated circuit.

Figure 4:
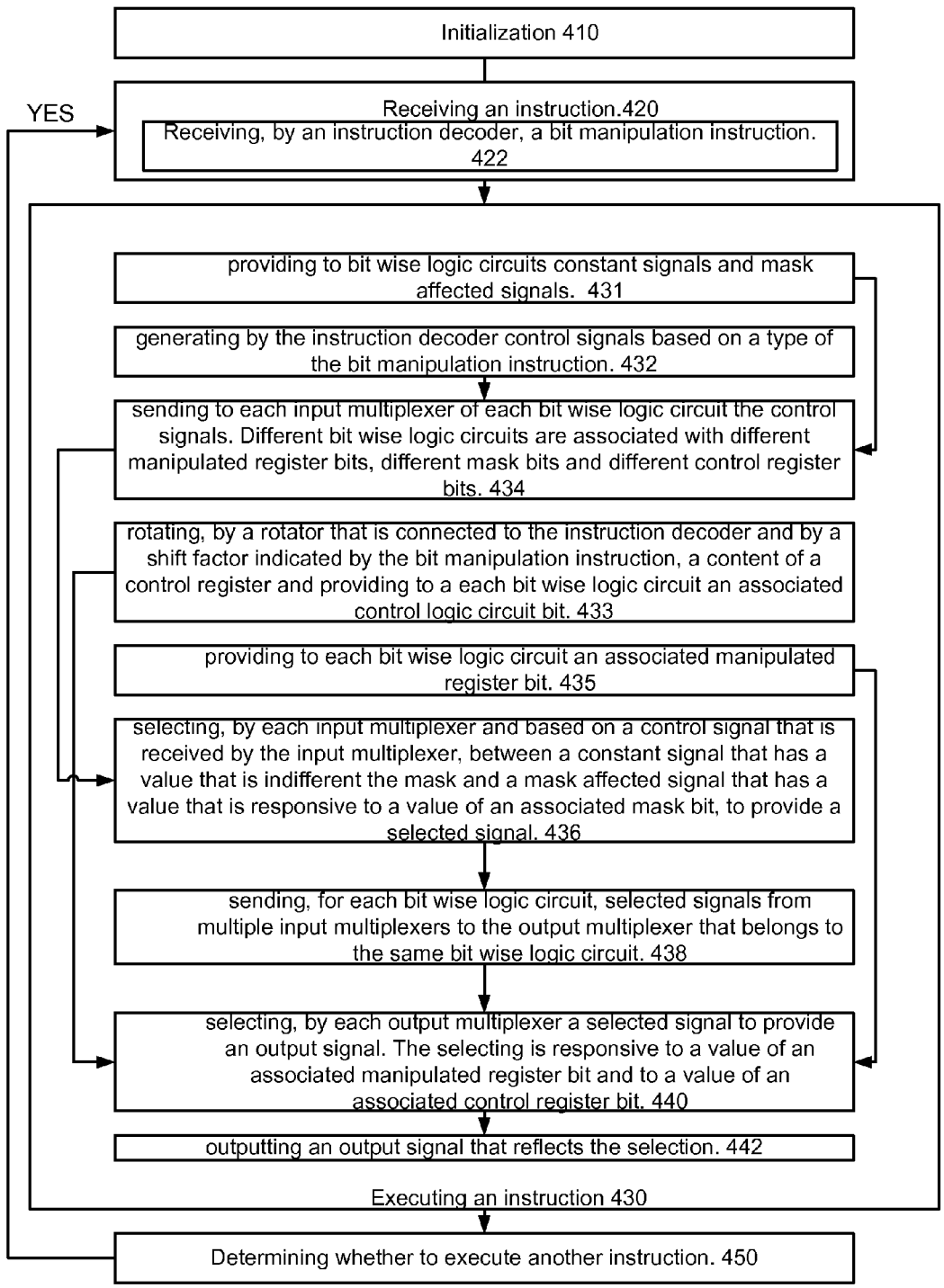
FIG. 4 schematically shows an example of an embodiment of a method.

Device 10 may be arranged to execute method 400 of FIG. 4. Device includes processor 12 and at least one other hardware component. For simplicity of explanation FIG. 2 illustrates only processor 12 and instruction memory 104. Processor 12 may be a RISC processor.

RISC processor 12 includes fetch unit 102, register array 100, instruction decoder 110, and execute unit 106. Execute unit 106 may includes multiple (J) bit wise logic circuits 150(1)-150(J), and bit selection unit 120. Bit selection unit 120 includes rotator 130. Fetch unit 102 is connected to instruction memory 104. Instruction memory 104 can be included in processor 12 although FIG. 2 illustrates instruction memory 104 as being connected to processor 12.

FIG. 2 illustrates instruction decoder 110 as being connected to register array 100, bit selection unit 120, and multiple bitwise logic circuits 150(0)-150(J−1). FIG. 1 also illustrates bit selection unit 120 as being connected to register array 100 and bitwise logic circuits 150(0)-150(J−1).

Register array 100 includes multiple registers such as 100(1)-100(p), wherein index p is a positive integer. For simplicity of explanation control register is denoted 100(c) and manipulated register is denoted 100(m). Index m and c are positive integers that differ from each other and range between 1 and p.

Processor 12 may execute multiple instructions such as but not limited to bit manipulation instruction 200. The execution may include sending an instruction to instruction decoder 110 and executing an instruction by execute unit 106. Execute unit 106 includes bit selection unit 130 and multiple bitwise logic circuits 150(0)-150(J−1), collectively denoted 150.

Figure 3:
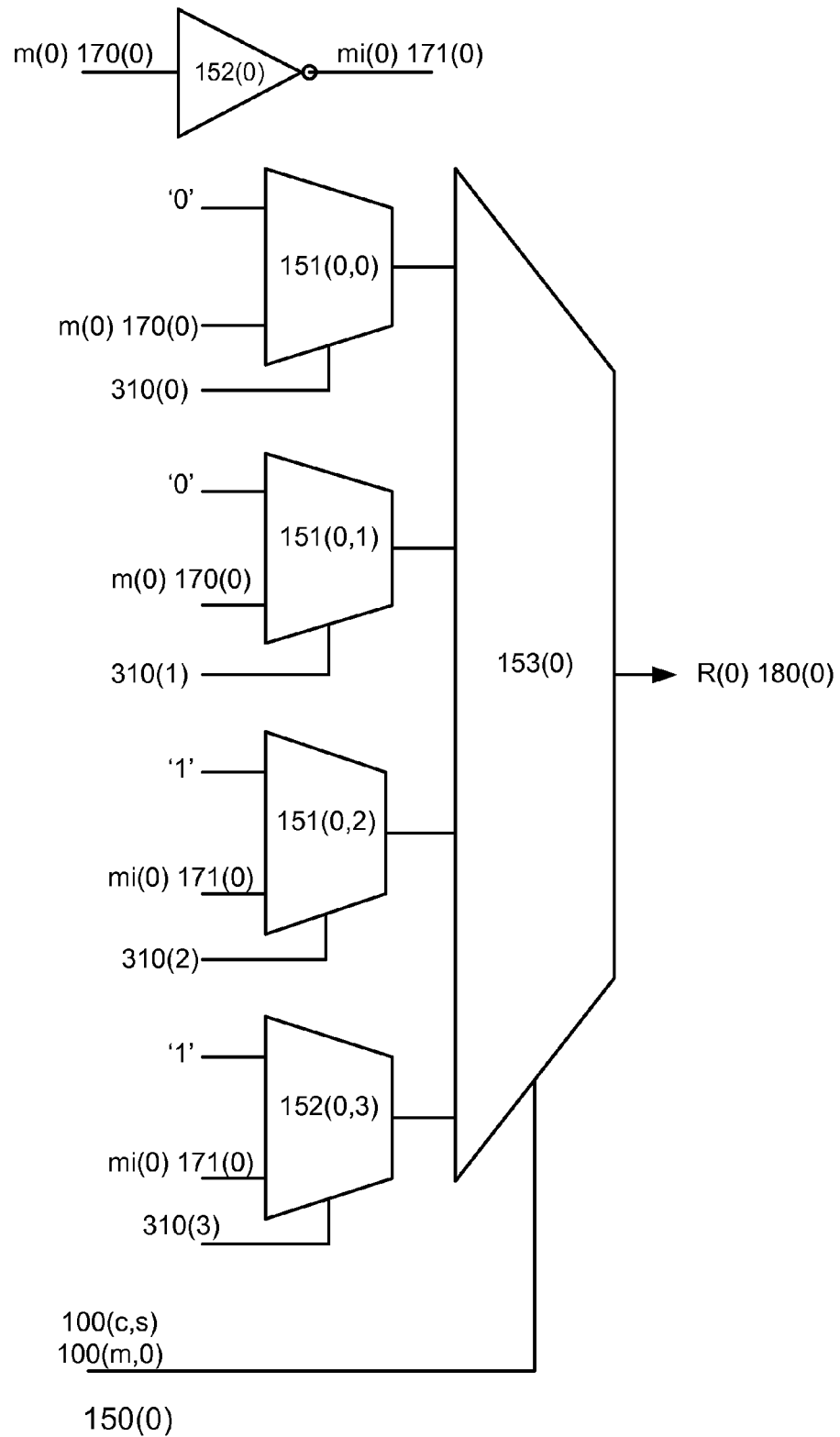
FIG. 3 schematically shows an example of an embodiment of a bitwise logic circuit.

FIG. 3 illustrates an example of an embodiment of bitwise logic circuit 150(0). Other bitwise logic circuits 150(1)-150(J−1) are substantially the same. The multiple bitwise logic circuits operate in parallel and the result of a bit manipulation instruction 200 may involve modifying none of the bits of manipulated register 100(m), some of the bits of manipulated register 100(m) or even the entire bits of manipulated register 100(m).

Bitwise logic circuit 150(0) includes four input multiplexers 151(0,0)-151(0,3), inverter 152(0) and output multiplexer 153(0). The outputs of four input multiplexers 151(0,0)-151(0,3) are coupled to four inputs of output multiplexer 153(0) and provide output multiplexer 153(0) selected signals. Output multiplexer 153(0) outputs output signal R(0) 180(0).

Output multiplexer 153(0) receives from bit selection logic 120 the first bit 100(m,0) of manipulated register 100(m) and the s'th bit 100(c,s) of control register 100(c). Output multiplexer 153(0) selects a selected signal out of the four selected signals based on the value of first manipulated register bit 100(m,0) and the s'th control register bit 100(c,s).

Each of first and second input multiplexers 151(0,0) and 151(0,1) receives as input a constant signal that equals '0', and a mask affected signal m(0) 170(0) that is the first bit (least significant bit) of a mask that is defined by first and second mask identifiers 220 and 222.

Each of third and fourth input multiplexers 151(0,2) and 151(0,3) receives as input a constant signal that equals '1', and a mask affected signal mi(0) 171(0) that equals an inverted value of the first bit of a mask that is defined by first and second mask identifiers 220 and 222. Mask affected signal m(0) 170(0) is inverted by inverter 152(0) to provide mi(0) 171(0).

Input multiplexers 150(0,0)-150(0,3) receive, from instruction decoder 110, control signals 310(0)-310(3) based on the bit manipulation instruction type identifier. These control signals cause the input multiplexers to select different inputs, as illustrated below.

Instruction decoder 110 sends to input multiplexers 150(0,0)-150(0,3) control signals that cause these input multiplexers to select a set of signals that equals zero, associated mask bit m(0), one and one if the bit manipulation instruction is a "Set associated manipulated register Bit if associated Control bit is Set" (SBCS) instruction.

Instruction decoder 110 sends to input multiplexers 150(0,0)-150(0,3) control signals that cause these input multiplexers to select a set of signals that equals an associated mask bit m(0), zero, one and one if the bit manipulation instruction is a "Set associated manipulated register Bit if associated Control bit is Reset" (SBCR) instruction.

Instruction decoder 110 sends to input multiplexers 150(0,0)-150(0,3) control signals that cause these input multiplexers to select a set of signals that equals zero, zero, one and inverted associated mask bit if the bit manipulation instruction is a "Reset associated manipulated register Bit if associated Control bit is Set" (RBCS) instruction.

Instruction decoder 110 sends to input multiplexers 150(0,0)-150(0,3) control signals that cause these input multiplexers to select a set of signals that equals zero, zero, inverted associated mask bit and one if the bit manipulation instruction is a "Reset associated manipulated register Bit if associated Control bit is Reset" (RBCR) instruction.

Instruction decoder 110 sends to input multiplexers 150(0,0)-150(0,3) control signals that cause these input multiplexers to select a set of signals that equals zero, associated mask bit, one and inverted associated mask bit if the bit manipulation instruction is a "Toggle associated manipulated register Bit if associated Control bit is Set" (TBCS) instruction.

Instruction decoder 110 sends to input multiplexers 150(0,0)-150(0,3) control signals that cause these input multiplexers to select a set of signals that equals associated mask bit, zero, inverted associated mask bit and one if the bit manipulation instruction is a "Toggle associated manipulated register Bit if associated Control bit is Reset" (TBCR) instruction.

Table 1 illustrates the values of control signals 150(0)-150 (3) for different types of bit manipulation instructions and the selected signal that is selected by input multiplexers 151(0, 0)-151(0,3) as result of these control signals.

TABLE 1

|        | SBCS | SBCR | RBCS | RBCR  | TBCS  | TBCR  |
|--------|------|------|------|-------|-------|-------|
| 310(0) | '0'  | m(0) | 0    | 0     | 0     | m(0)  |
| 310(1) | m(0) | 0    | 0    | 0     | m(0)  | 0     |
| 310(2) | 1    | 1    | 1    | mi(0) | 1     | mi(0) |
| 310(3) | 1    | 1    | mi(0)| 1     | mi(0) | 1     |

The following pseudo-codes represent the execution of the various bit manipulation instructions:

"Reset associated manipulated register Bit if associated Control bit is Set" (RBCS) instruction:
Temp=rotate (Rc, s);
Rm=(Rm AND Temp AND mask) OR (Rm AND In_mask).

Wherein "Rc" represents control register $100(c)$, "s" represents the shift factor, "rotate" represents a rotate operation by shift factor s, "AND" represents a logic AND operation, "Rm" represents manipulated register $100(m)$, "OR" represents a logic OR operation, "mask" represents the mask, and "In_mask" represents an inverted value of the mask.

"Reset associated manipulated register Bit if associated Control bit is Reset" (RBCR) instruction:
Temp=rotate (Rc, s);
Rm=(Rm AND In_Temp AND mask) OR (Rm AND In_mask).

"Set associated manipulated register Bit if associated Control bit is Set" (SBCS) instruction:
Temp=rotate (Rc, s);
Rm=(Rm OR [Temp AND mask]) OR (Rm AND In_mask).

"Set associated manipulated register Bit if associated Control bit is Reset" (SBCR) instruction:
Temp=rotate (Rc, s);
Rm=(Rm OR [In_Temp AND mask]) OR (Rm AND In_mask).

"Toggle associated manipulated register Bit if associated Control bit is Set" (TBCS) instruction:
Temp=rotate (Rc, s);
Rm=(Rm XOR [Temp AND mask]) OR (Rm AND In_mask).

"Toggle associated manipulated register Bit if associated Control bit is Reset" (TBCR) instruction:
Temp=rotate (Rc, s);
Rm=(Rm XOR [In_Temp AND mask]) OR (Rm AND In_mask).

Referring back to FIG. 2, bit selection logic 120 sends the j'th manipulated register bit $100(m,j)$ to the j'th bitwise logic circuit $150(j)$. The dashed arrow that connects bit selection logic 120 to bitwise logic circuits 150 indicates that bit selection logic 120 rotates (by rotator 130 and by shift factor s) the j'th bit of control register $100(c)$ and sends the k'th control register bit $100(c,k)$ to the j'th bitwise logic circuit $150(j)$, wherein k=(j+s) Modulo J. If, for example s equals zero than the j'th bitwise logic circuit $150(j)$ receives the j'th control register bit $100(c,j)$. In other words, the j'th bitwise logic circuit $150(j)$ is associated with the j'th manipulated register bit $100(m,j)$ and the k'th control register bit $100(c,k)$.

FIG. 4 schematically shows an example of an embodiment of method 400 for performing bitwise manipulations.

Method 400 starts by initialization stage 410. Stage 410 may include initializing a variable, starting to execute a program that includes at least one instruction. The program may be a control code, a communication program that includes control portions and the like. Stage 410 may also include initializing a processor such as bit not limited to a RISC processor.

Stage 410 is followed by stage 420 of receiving an instruction. Stage 420 may include stage 422 of receiving, by an instruction decoder, a bit manipulation instruction.

Stage 420 is followed by stage 430 of executing the instruction. If the instruction is a bit manipulation instruction such as but not limited to bit manipulation instruction 200 of FIG. 1 than stage 430 may include stages 431, 432, 433, 434, 436, 438, 440, and 442.

Stage 431 includes providing to bitwise logic circuits constant signals and mask affected signals. A constant signal has a value that is indifferent to the value of the mask. A mask affected signal has a value that is responsive to a value of an associated mask bit. The constant signal may be indifferent to the type of the bit manipulation instruction but this is not necessarily so as it may be responsive to the type of the bit manipulation instruction. It is noted that FIG. 3 illustrates constant signals that are indifferent to the type of the bit manipulation instruction but that instruction decoder 110 may generate constant signals that differ from one type of bit manipulation instruction to the other.

Stage 431 may include providing to at least one input multiplexer of each bitwise logic circuit a mask affected signal that has a value that equals a value of the associated mask bit and providing to at least one other input multiplexer of each bitwise logic circuit a mask affected signal that has a value that equals an inverted value of the associated mask bit. Stage 431 may include providing to two input multiplexers of each bitwise logic circuit a mask affected signal that has a value that equals a value of the associated mask bit. Additionally or alternatively, stage 431 may include providing to two other input multiplexers of each bitwise logic circuit a mask affected signal that has a value that equals an inverted value of the associated mask bit.

Stage 432 includes generating by the instruction decoder control signals based on a type of the bit manipulation instruction, wherein the instruction decoder is coupled to multiple bitwise logic circuits.

Stages 431 and 432 are followed by stage 434 of sending to each input multiplexer of each bitwise logic circuit the control signals. Different bitwise logic circuits are associated with different manipulated register bits, different mask bits and different control register bits.

Stage 433 includes rotating, by a rotator that is connected to the instruction decoder and by a shift factor indicated by the bit manipulation instruction, a content of a control register and providing to each bitwise logic circuit an associated control logic circuit bit.

Stage 435 includes providing to each bitwise logic circuit an associated manipulated register bit.

Stage 434 is followed by stage 436 of selecting, by each input multiplexer and based on a control signal that is received by the input multiplexer, between a (a) constant signal that has a value that is indifferent to the value of the mask and (b) a mask affected signal that has a value that is responsive to a value of an associated mask bit, to provide a selected signal.

Stage 436 may include at least one of the following: (i) selecting a set of signals that equals zero, associated mask bit, one and one if the bit manipulation instruction is a "set associated manipulated register bit if associated control bit is set"

instruction; (ii) selecting a set of signals that equals an associated mask bit, zero, one and one if the bit manipulation instruction is a "set associated manipulated register bit if associated control bit is reset" instruction; (iii) selecting a set of signals that equals zero, zero, one and inverted associated mask bit if the bit manipulation instruction is a "reset associated manipulated register bit if associated control bit is set" instruction, (iv) selecting a set of signals that equals zero, zero, inverted associated mask bit and one if the bit manipulation instruction is a "reset associated manipulated register bit if associated control bit" is reset instruction, (v) selecting a set of signals that equals zero, associated mask bit, one and inverted associated mask bit if the bit manipulation instruction is a "toggle associated manipulated register bit if associated control bit is set" instruction, or (vi) selecting a set of signals that equals associated mask bit, zero, inverted associated mask bit and one if the bit manipulation instruction is a "toggle associated manipulated register bit if associated control bit is reset" instruction.

Stage 436 is followed by stage 438 of sending, for each bitwise logic circuit, selected signals from multiple input multiplexers to the output multiplexer that belongs to the same bitwise logic circuit.

Stages 433, 435 and 438 are followed by stage 440 of selecting, by each output multiplexer a selected signal to provide an output signal. The selecting is responsive to a value of an associated manipulated register bit and to a value of an associated control register bit.

Stage 440 is followed by stage 442 of outputting an output signal that reflects the selection. Stage 442 can include writing output signals provided my the multiple bitwise logic circuits to the manipulated register, transmitting these output signals, displaying the output signals, and the like.

Stage 430 can be followed by stage 450 of determining whether to execute another instruction. If the answer is positive then stage 450 is followed by stage 420. Else, the execution of the program ends.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. Any two components so associated can also be viewed as being "operably connected," or "operably coupled," to each other to achieve the desired functionality.

However, other modifications, variations, and alternatives are also possible. The specifications and drawings are, accordingly, to be regarded in an illustrative rather than in a restrictive sense.

The word 'comprising' does not exclude the presence of other elements or steps then those listed in a claim.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:
1. A device, comprising:
an instruction decoder configured to:
  receive a bit manipulation instruction; and
  send a set of control signals based on a type of the bit manipulation instruction; and
multiple bitwise logic circuits, each bitwise logic circuit being coupled to the instruction decoder, wherein:
  each bitwise logic circuit comprises one or more input multiplexers, each input multiplexer including a control input coupled to the instruction decoder a first data input, a second data input, and a data output coupled to an output multiplexer; and
each bitwise logic circuit is associated with manipulated register bits, mask bits, and control register bits that are different from other manipulated register bits, other mask bits, and other control register bits associated with each other bitwise logic circuit;
wherein each input multiplexer of each bitwise logic circuit is configured to:
  receive one of the control signals at the control input, receive a constant signal at the first data input, wherein the constant signal has a value that is indifferent to a value of a mask, and receive a mask affected signal at the second data input, wherein the mask affected signal has a value that is responsive to a value of an associated mask bit;
  select between the constant signal and the mask affected signal based on the control signal; and
  output a selected signal; and
wherein each output multiplexer is configured to:
  receive the selected signal from each of the input multiplexers;
  select between the selected signals based on a value of the associated manipulated register bits and based on a value of the associated control register bits; and
  output an output signal.

2. The device according to claim 1, further comprising a rotator configured to rotate, by a shift factor indicated by the bit manipulation instruction, a content of a control register to provide to each bitwise logic circuit an associated control logic circuit bit.

3. The device according to claim 1, wherein:
the instruction decoder is further configured to generate a different set of control signals per each type of bit manipulation instruction;
the types of the bit manipulation instructions comprise a bit toggle instruction; and
each bitwise logic circuit is configured to selectively toggle the associated manipulated register bit based on a value of the associated control register bit.

4. The device according to claim 1, wherein:
the instruction decoder is configured to generate a different set of control signals per each type of the bit manipulation instruction;
the types of the bit manipulation instructions comprise a bit set instruction; and each bitwise logic circuit is configured to selectively set an associated manipulated register bit based on a value of the associated control register bit.

5. The device according to claim 1, wherein:
at least one input multiplexer of each bitwise logic circuit is configured to receive a mask affected signal that comprises a value that equals a value of the associated mask bit; and
at least one other input multiplexer of each bitwise logic circuit is configured to receive a mask affected signal that comprises a value that equals an inverted value of the associated mask bit.

6. The device according to claim 1, wherein:
a first input multiplexer and a second input multiplexer of each bitwise logic circuit are configured to:
receive a mask affected signal that comprises a value that equals a value of the associated mask bit; and
receive a constant signal that equals zero; and
a third input multiplexer and a fourth input multiplexer of each bitwise logic circuit are configured to:
receive a mask affected signal that comprises a value that equals an inverted value of the associated mask bit; and
receive a constant signal that equals one.

7. The device according to claim 1, wherein a respective four input multiplexers of each bitwise logic circuit are configured to:
select a set of signals that equals zero, the associated mask bit, one, and one, if the bit manipulation instruction is a set associated manipulated register bit if associated control bit is set instruction;
select a set of signals that equals the associated mask bit, zero, one, and one, if the bit manipulation instruction is a set associated manipulated register bit if associated control bit is reset instruction;
select a set of signals that equals zero, zero, one, and an inverted value of the associated mask bit, if the bit manipulation instruction is a reset associated manipulated register bit if associated control bit is set instruction; and
select a set of signals that equals zero, zero, the inverted value of the associated mask bit, and one, if the bit manipulation instruction is a reset associated manipulated register bit if associated control bit is reset instruction.

8. The device according to claim 1, wherein a respective four input multiplexers of each bitwise logic circuit are configured to:
select a set of signals that equals zero, the associated mask bit, one, and an inverted value of the associated mask bit, if the bit manipulation instruction is a toggle associated manipulated register bit if associated control bit is set instruction; and
select a set of signals that equals the associated mask bit, zero, the inverted value of the associated mask bit, and one, if the bit manipulation instruction is a toggle associated manipulated register bit if associated control bit is reset instruction.

9. The device according to claim 1, wherein the instruction decoder is configured to generate mask bits based on a mask indicator included in the bit manipulation instruction.

10. The device according to claim 1, further comprising:
a bit selection unit that is coupled to the instruction decoder, to a register array, and to each bitwise logic circuit, wherein:
the instruction decoder is configured to send selection signals to the bit selection unit based on the bit manipulation instruction; and
the bit selection unit is configured to:
send, based on the selection signals, associated manipulated register bits to the bitwise logic circuits; and
send the control register bits to a rotator.

11. The device according to claim 1, wherein the instruction decoder is further configured to:
receive a bit manipulation instruction that comprises at least one mask identifier, a shift factor identifier, a control register identifier, a manipulated register identifier and a bit manipulation instruction type identifier;
send to each input multiplexer of each bitwise logic circuit the control signal based on the bit manipulation instruction type identifier;
send to a rotator an instruction to rotate a content of a control register based on the shift factor identifier; and
send selection signals to a bit selection unit based on the control register identifier and the manipulated register identifier.

12. A device, comprising:
a fetch unit configured to fetch a bit manipulation instruction, the bit manipulation instruction comprising at least one mask identifier, a shift factor identifier, a control register identifier, a manipulated register identifier, and a bit manipulation instruction type identifier;
an instruction decoder configured to:
receive from the fetch unit the bit manipulation instruction;
send a control signal based on the bit manipulation instruction type identifier to each input multiplexer of a plurality of input multiplexers of each bitwise logic circuit of a plurality of bitwise logic circuits of the device;
send to a rotator an instruction to rotate a content of the control register based on the shift factor identifier; and
send selection signals to a bit selection unit based on the control register identifier and manipulated register identifier; and
an execution unit that comprises the plurality of bitwise logic circuits, the bit selection unit, and the rotator, wherein the execution unit is configured to complete an execution of the bit manipulation instruction based on control signals sent by the instruction decoder.

13. A method for performing bitwise manipulation, the method comprising:
receiving, by an instruction decoder, a bit manipulation instruction;
generating, by the instruction decoder, control signals based on a type of the bit manipulation instruction, wherein the instruction decoder is coupled to multiple bitwise logic circuits;
sending, to each input multiplexer of a plurality of input multiplexers of each bitwise logic circuit of a plurality of bitwise logic circuits, one control signal of the control signals;
wherein each bitwise logic circuits is associated with different control register bits;
selecting, by each input multiplexer, and based on the associated control signal that is received by each input multiplexer, between a constant signal that has a value that is indifferent to the value of a mask, and a mask affected signal that has a value that is responsive to a value of an associated mask bit, to provide a selected signal;

sending, for each bitwise logic circuit, the selected signals from each input multiplexer to an output multiplexer that belongs to the same bitwise logic circuit;

selecting, by each output multiplexer a selected signal to provide an output signal; wherein the selecting is responsive to a value of an associated manipulated register bit and to a value of an associated control register bit; and outputting an output signal that reflects the selection.

14. The method according to claim 13 further comprising:
rotating, by a rotator that is coupled to the instruction decoder, and by a shift factor indicated by the bit manipulation instruction, a content of a control register; and providing to each bitwise logic circuit an associated control logic circuit bit.

15. The method according to claim 13 further comprising, selectively toggling manipulated register bits, by the multiple bitwise logic circuits, based on a value of the associated control register bit if the bit manipulation instruction type is a bit toggle instruction.

16. The method according to claim 13 further comprising:
providing, to at least one input multiplexer of each bitwise logic circuit, a mask affected signal that has a value that equals a value of the associated mask bit; and providing, to at least one other input multiplexer of each bitwise logic circuit, a mask affected signal that has a value that equals an inverted value of the associated mask bit.

17. The method according to claim 13 further comprising:
providing, to two input multiplexers of each bitwise logic circuit, a mask affected signal that has a value that equals a value of the associated mask bit; and providing, two to other input multiplexers of each bitwise logic circuit, a mask affected signal that has a value that equals an inverted value of the associated mask bit.

18. The method according to claim 13 further comprising:
selecting a set of signals that equals zero, the associated mask bit, one, and one, if the bit manipulation instruction is a set associated manipulated register bit if associated control bit is set instruction;

selecting a set of signals that equals the associated mask bit, zero, one, and one, if the bit manipulation instruction is a set associated manipulated register bit if associated control bit is reset instruction;

selecting a set of signals that equals zero, zero, one, and an inverted value of the associated mask bit, if the bit manipulation instruction is a reset associated manipulated register bit if associated control bit is set instruction; and selecting a set of signals that equals zero, zero, the inverted value of the associated mask bit, and one, if the bit manipulation instruction is a reset associated manipulated register bit if associated control bit is reset instruction.

19. The method according to claim 12 further comprising:
selecting a set of signals that equals zero, the associated mask bit, one, and an inverted value of the associated mask bit, if the bit manipulation instruction is a toggle associated manipulated register bit if associated control bit is set instruction;

selecting a set of signals that equals, the associated mask bit, zero, the inverted value of the associated mask bit, and one, if the bit manipulation instruction is a toggle associate manipulated register bit if associated control bit is reset instruction;

selecting a set of signals that equals zero, the associated mask bit, one, and one, if the bit manipulation instruction is a set associated manipulated register bit if associated control bit is set instruction;

selecting a set of signals that equals the associated mask bit, zero, one, and one if the bit manipulation instruction is a set associated manipulated register bit if associated control bit is reset instruction;

selecting a set of signals that equals zero, the associated mask bit, one, and the inverted value of the associated mask bit, if the bit manipulation instruction is a toggle associated manipulated register bit if associated control bit is set instruction; and selecting a set of signals that equals the associated mask bit, zero, the inverted value of the associated mask bit, and one, if the bit manipulation instruction is a toggle associated manipulated register bit if associated control bit is reset instruction.

20. The method according to claim 13 further comprising:
receiving, by the instruction decoder, a bit manipulation instruction that comprises at least one mask identifier, a shift factor identifier, a control register identifier, a manipulated register identifier and a bit manipulation instruction type identifier;

sending, by the instruction decoder to each input multiplexer of each bitwise logic circuit, the control signal based on the bit manipulation instruction type identifier;

sending, by the instruction decoder to the rotator, an instruction to rotate a content of a control register based on the shift factor identifier; and sending, by the instruction decoder, selection signals to a bit selection unit based on the control register identifier and manipulated register identifier.

* * * * *